US012655896B2

(12) United States Patent (10) Patent No.: US 12,655,896 B2
Turek et al. (45) Date of Patent: Jun. 16, 2026

(54) FLEX SPLINE FOR STRAIN WAVE DRIVE

(71) Applicant: Hamilton Sundstrand Corporation, Charlotte, NC (US)

(72) Inventors: Łukasz Turek, Wrocław (PL); Jonathan A. Darby, Newcastle (GB); Paweł Chmielewski, Brzezia Łąka (PL); Marcin Cis, Lutynia (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/584,384

(22) Filed: Feb. 22, 2024

(65) Prior Publication Data

US 2024/0288056 A1 Aug. 29, 2024

(30) Foreign Application Priority Data

Feb. 23, 2023 (EP) ..................................... 23461519

(51) Int. Cl.
F16H 49/00 (2006.01)
B64C 13/28 (2006.01)
(52) U.S. Cl.
CPC ........... F16H 49/001 (2013.01); B64C 13/28 (2013.01); *F16H 2049/003* (2013.01)
(58) Field of Classification Search
CPC .. F16H 49/001; F16H 2049/003; B64C 13/28
See application file for complete search history.

(56) References Cited

U.S. PATENT DOCUMENTS

| | | | |
|---|---|---|---|
| 3,435,705 A | 4/1969 | Musser | |
| 9,644,728 B2 * | 5/2017 | Hoshina | F16H 49/001 |
| 10,883,590 B2 * | 1/2021 | Balsiger | H02K 7/116 |
| 2013/0333515 A1 | 12/2013 | Yeh | |
| 2018/0187763 A1 | 7/2018 | Xie et al. | |

(Continued)

FOREIGN PATENT DOCUMENTS

| | | |
|---|---|---|
| CN | 103649586 B | 11/2016 |
| CN | 108253091 A | 7/2018 |

(Continued)

OTHER PUBLICATIONS

Abstract for CN103649586(B); Published: Nov. 2, 2016, 1 page.

(Continued)

*Primary Examiner* — William C Joyce
(74) *Attorney, Agent, or Firm* — CANTOR COLBURN LLP

(57) ABSTRACT

A flex spline for a strain wave drive. The flex spline includes: a flexible tubular body having a first open end and a second open end; a first set of radially outwardly extending teeth around its outer periphery at the first open end; a second set of radially outwardly extending teeth around its outer periphery at the second open end; and a third set of radially inwardly outwardly teeth located axially between the first and the second sets of teeth. The body also includes one or more sections of changed geometry located between the first and second sets of teeth and/or the second and third sets of teeth, the sections of changed geometry being provided with a geometric feature in the flex spline body that is not present in the remainder of the flex spline body.

12 Claims, 4 Drawing Sheets

(56)                    References Cited

U.S. PATENT DOCUMENTS

2021/0071744  A1*    3/2021   Balsiger ............... F16H 49/001

FOREIGN PATENT DOCUMENTS

CN          111102340  A      5/2020
JP          2019143745  A   *   8/2019   .............. F16H 1/32

OTHER PUBLICATIONS

Abstract for CN108253091(A); Published: Jul. 6, 2018, 1 page.
Abstract for CN111102340(A); Published: May 5, 2020, 1 page.
Abstract for JP2019143745(A); Published Aug. 29, 2019, 1 page.
European Search Report for Application No. 23461519.3, mailed
Jul. 18, 2023, 10 pages.

* cited by examiner

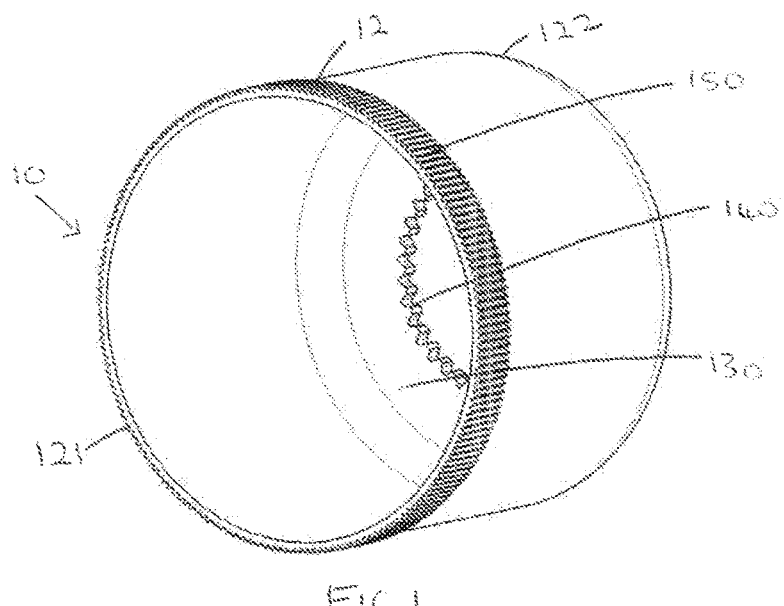
FIG. 1
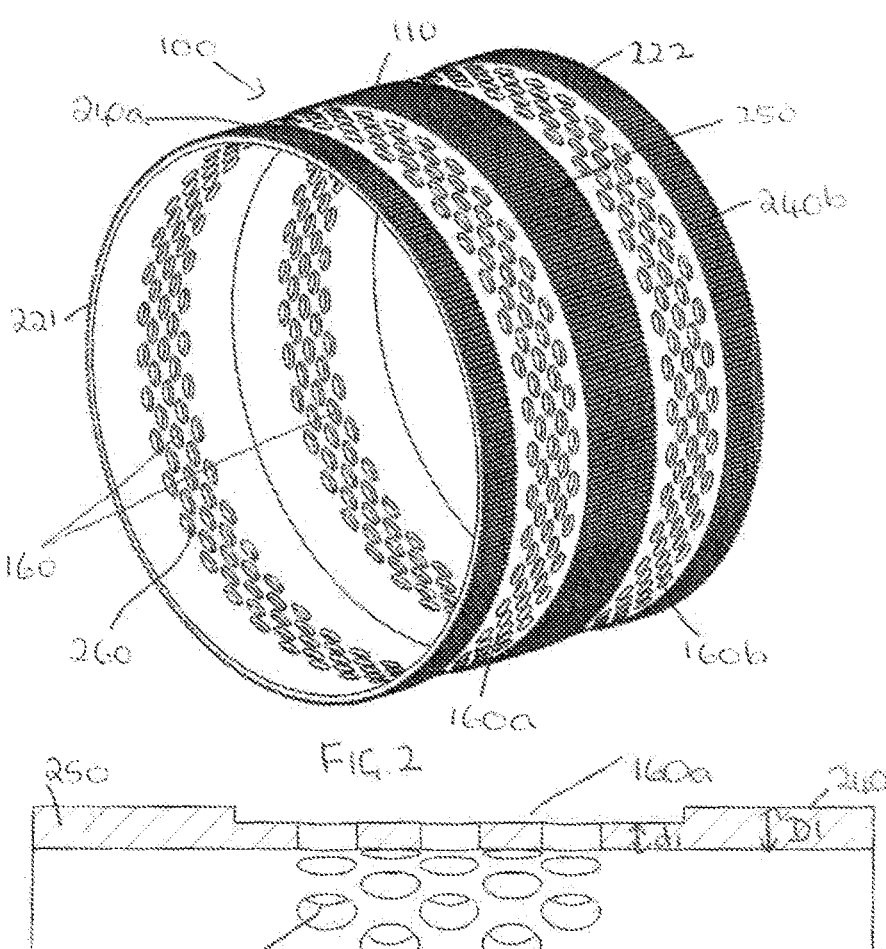
FIG. 2
FIG. 3

FLEX SPLINE FOR STRAIN WAVE DRIVE

CROSS REFERENCE TO RELATED APPLICATIONS

This application claims priority to European Patent Application No. 23461519.3 filed Feb. 23, 2023, the entire contents of which is incorporated herein by reference.

TECHNICAL FIELD

The present disclosure relates to a flex spline for a strain wave drive particularly a strain wave drive for rotary actuation of flight control surfaces of an aircraft.

BACKGROUND

Rotary actuation of devices or surfaces e.g. flight control surfaces in an aircraft, requires high torque drive and so typically requires gearing between the electric motor, which is typically high speed, low torque, and the output shaft of the actuator that drives the surface. Conventional involute gears, comprising a number of intermeshing toothed wheels to create the required gear ratio, are relatively large and heavy and the higher the required ratio, the more gears and, thus, the greater the size and weight of the overall actuator system.

In aircraft in particular, and also in other applications, there is a need to minimise the size and weight of components and there is a desire to provide a gear or drive that can provide the required torque ratio using a smaller, lighter, more compact arrangement.

A known type of gear mechanism that is particularly compact is the strain wave drive or gear. Strain wave gearing, also known as a harmonic drive, is used in many drive trains as it is compact and lightweight and can be used to provide a high gear ratio between an input or drive shaft and an output shaft. These properties make strain wave gearing suited to use in aircraft and other vehicles where space is limited and weight of components should be minimised, whilst maintaining reliability and performance.

A strain wave gear system includes a wave generator which is in the form of an elliptical shaft and a compliant ball bearing in which the elliptical shaft rotates. A flexible toothed ring (a flex spline) is mounted about the wave generator and engages, and conforms to the shape of, the output shaft. A fixed outer ring, or circular spline is provided around the flex spline and has inner teeth that engage with the outer teeth of the flex spline but, due to the elliptical shape of the wave generator, the flex spline only engages with the teeth of the outer ring at the major diameter of the wave generator.

In operation, a drive shaft, connected to the wave generator, is rotated e.g. by a motor, which causes rotation of the wave generator. The bearing conforms to the elliptical shape of the wave generator. The flex spline conforms to the shape of the drive shaft and so as the wave generator rotates, the flex spline will only engage with the inner teeth of the outer ring at the major axes of the ellipse. The circular spline has a different number of inner teeth to the number of outer teeth of the flex spline. Rotation of the drive shaft thus causes a slower rotation of the output shaft by its engagement with the flex spline. The output shaft is connected to the device or surface to be moved by the actuator.

Known strain wave drives, however, have to be designed with built-in compliance (as discussed below) to ensure correct load distribution and engagement of the teeth. This adds to the costs and complexity of such components for use in e.g. flight control rotary actuation. There is, therefore, a desire for an improved flex spline for a strain wave drive and a strain wave drive that retains the benefits of compactness and light weight whilst overcoming problems associated with existing strain wave drive flex splines.

SUMMARY

According to the disclosure, there is provided a flex spline for a strain wave drive, the flex spline comprising: a flexible tubular body having a first open end and a second open end; a first set of radially outwardly extending teeth around its outer periphery at the first open end; a second set of radially outwardly extending teeth around its outer periphery at the second open end; and a third set of radially inwardly outwardly teeth located axially between the first and the second sets of teeth; and wherein the body further comprises one or more sections of changed geometry located between the first and second sets of teeth and/or the second and third sets of teeth, the sections of changed geometry being provided with a geometric feature in the flex spline body that is not present in the remainder of the flex spline body.

BRIEF DESCRIPTION

Examples of the strain wave drive according to the disclosure will now be described with reference to the drawings. It should be noted that these are examples only and variations are possible within the scope of the claims.

FIG. 1 shows a 3D view of a known cup-shaped type of flex spline for a strain wave drive.

FIG. 2 shows a 3D view of one example of a straight flex spline for a strain wave drive according to this disclosure.

FIG. 3 shows in close up the geometry of an example of a flex spline as shown in FIG. 2.

DETAILED DESCRIPTION

Figure 4:
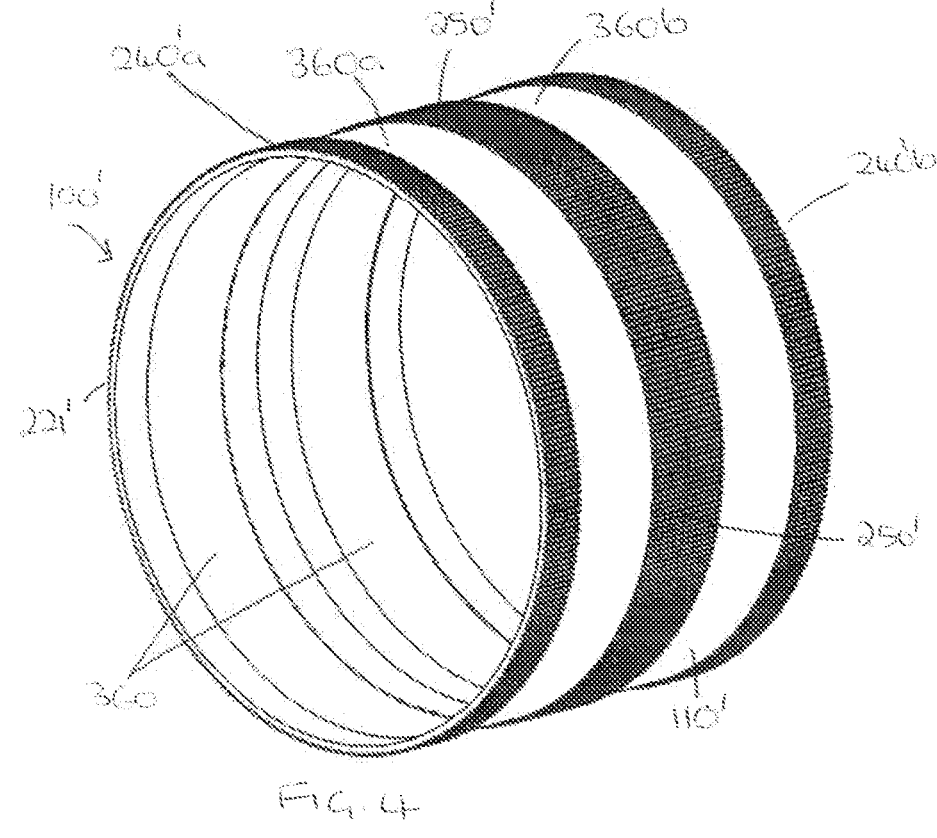
FIG. 4 shows a 3D view of another example of a straight flex spline for a strain wave drive according to this disclosure.

As mentioned above, conventional drives for moving e.g. flight control surfaces in aircraft, have used a series of inter-meshing gear wheels. In an attempt to reduce the overall size and weight of the gearing, thought has been given to the use of the more compact strain wave gears or drives (also known as harmonic drives). Such strain wave drives essentially consist of three main parts: a wave generator, driven by the motor drive shaft, is an elliptical shaft having bearings arranged around the outer perimeter thereof. The wave generator is located within a cylindrical flex spline which is a flexible annular component having radially outwardly extending teeth. The flex spline is sufficiently flexible to take up the elliptical shape of the wave generator as the wave generator and its bearings rotate within the flex spline. A rigid circular spline is a ring that fits around the flex spline. The circular spline has inwardly extending teeth. As the wave generator is rotated by the motor, it causes the flex spline to take up the elliptical shape such that the outwardly extending teeth of the flex spline mesh with the inwardly extending teeth of the output circular spline at the locations of the major axis of the ellipse. The output circular spline typically has more teeth than the flex spline such that as the teeth engage, the output circular spline is caused to rotate relative to the flex spline at a rate of rotation different to that of the motor. Strain wave drives are well-known and the general structure and operation will not be described further.

Current designs of strain wave drives for rotary actuation of flight control surfaces require a right-angled cup-shaped flex spline to provide the flex spline function within the available space envelope and with the required strength and torsional stiffness. A straight flex spline profile would need to be excessively long to provide the required torsional stiffness, and this would be detrimental in terms of weight, performance and envelope. The right-angle cup shape adds stiffness and distributes stress through the earthed parts of the system. An example of such a flex spline is shown in FIG. 1. Because the flex spline is cup-shaped, it has to be formed as two cup parts for manufacturing and assembly purposes, the two cup parts meeting at a join aligned with the output ring gear sandwiched between the earth gears. FIG. 1 shows one cup part—the other cup part would be a mirror image and the two parts would be joined with their output splines adjacent each other. The cup-shaped flex spline 10 comprises a cylindrical body 12 having a first, open end 121 and a second end 122 across which is formed a flange 130 to provide stiffening of the flex spline. Earth splines 140, configured to engage with earth rings of the strain wave drive (not shown) are formed in the flange 130. Output splines 150 are provided around the outer circumference of the flex spline body at its open end 121 to mesh with the output ring of the strain wave drive (not shown).

Briefly (and not shown in the drawings as this is well-known), the conventional strain wave drive has a wave generator, rotatable about axis. Bearings are provided around the perimeter of the wave generator. The flex spline 10 is fitted around the wave generator to engage with the bearings to take up the elliptical shape of the wave generator. As mentioned above, conventionally, two cup-shaped flex splines 10 are provided, each formed with a flange 130. Teeth (the output spline 150) on the outer surface of the flex spline engage, at certain positions of rotation, with inwardly extending teeth of the output ring gear. The earth gears may be fixed relative to the actuator housing or other fixed component and the flex spline may engage with an output shaft or output ring gear which is caused to rotate with rotation of the point of engagement with the flex spline as the wave generator rotates. The output gear rotates according to the gear ratio and may be fixed to a part or surface to be rotated e.g. a flight control surface.

Because there is uneven loading on the flex spline 10 between the wave generator, via the bearings, and the output gear, and loads are transmitted from the flex spline through the earth gears, deflection of the flex spline creates a 'coning' effect. The split, two-part flex spline forms a conical shape at its interface with the output gear and the earth gears which can cause an uneven interference between the inter-meshing teeth at some positions, i.e. when the flex spline deflects, it engages with the corresponding teeth at an angle. This angle may also vary under changing loads and temperatures.

Further, to allow the cup-shaped flex spline to deflect to take up the elliptical form to engage with the output circular spline, the body of the flex spline needs to be sufficiently long to accommodate the range of deflection. This compromises the torsional stiffness and space taken up by the design.

To take into account the tilt between the output meshing spline when the flex spline is deformed, compliance needs to be built into the structural body of the flex spline to ensure uniform load distribution and optimal torsional stiffness.

The conventional cup-shaped flex spline 10, whilst providing sufficient stiffness at the flange, are not optimal in terms of their size, shape, weight, strength and cost and complexity of manufacture and assembly.

To address these problems, the strain wave drive of this disclosure uses a straight flex spline (i.e. a tube shaped flex spline without flanges) which allows full torque and deformation capability without compromising the design space, manufacturing and assembly, cost and weight, which has compliance built into the body of the flex spline. The compliance is provided by geometrical features of the tubular flex spline body that produce a change in geometry across the body to vary its torsional stiffness. The change in geometry in the body provides for more flexibility in the flex spline as a whole for the same size/length of flex spline body.

The compliance is provided by one or more sections of a changed geometry along the flex spline body compared to the rest of the body, the changed geometry resulting in the one or more sections being more flexible than the rest of the body. The one or more sections of changed geometry extend around the circumference of the body at an axial location between the ends of the tubular body.

Various ways of changing the geometry to add flexibility can be envisaged. Some examples are shown in FIGS. 2 to 9.

In one example, as shown in FIGS. 2 and 3, the changed geometry comprises perforations through the flex spline body.

The flex spline is a tubular member 100 having a body 110 extending from a first open end 221 to a second open end 222. Earth splines 240$a$, 240$b$ are provided around the outer circumference of the body at the first and second open ends to engage with earth rings as described above. Output splines 250 are provided around the flex spline body at a position substantially half way between the first and second open ends to engage with the output ring as described above. One or more sections (here two sections 160$a$, 160$b$) are provided in the flex spline body between the first and the second open ends to add flexibility and compliance. In the example shown, a first section 160$a$ is provided between the earth splines 240$a$ at the first open end 221 and the output splines 250, and a second section 160$b$ is provided between the earth splines 240$b$ at the second open end 222 and the output splines 250. Each of the sections 160$a$, 160$b$ is provided with a plurality of perforations 260 that extend through the flex spline body. The size, number and distribution of the perforations 260 can vary depending on the application and demands of the strain wave guide incorporating the flex spline 100. The perforations are preferably elliptical or non-circular in cross-section, but may, in some cases, be circular.

Further flexibility is provided at these sections if the thickness $d1$ of the body in these sections is less than the thickness $D1$ of the body with the earth/output splines 240$a$, 240$b$/250 adjacent these sections as seen in FIG. 3.

Figure 5:
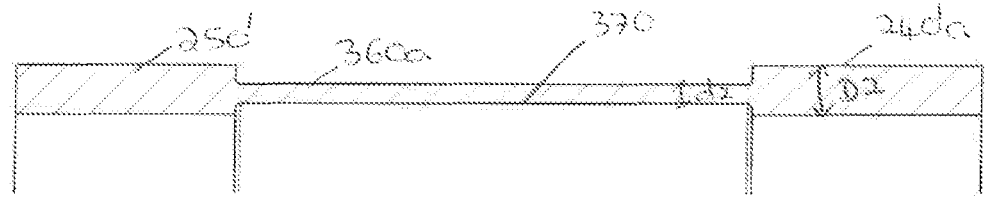
FIG. 5 shows in close up the geometry of an example of a flex spline as shown in FIG. 4.

An alternative way in which the changed geometry can be provided is shown in FIGS. 4 and 5 where, instead of perforated sections, the body has thinner sections 360a, 360b. The other features of FIG. 3 are the same as described above in relation to FIG. 2 and the same reference numerals have been used with an additional '. The thinner sections 360a, 360b are formed in the body to have a depth d2 less than the thickness D2 of the body either side of the thinner sections. Specifically, the thinner section in this example is formed by an undercut 370 on the inner wall—i.e. at the inner diameter of the flex spline body. The actual thickness can be varied depending on the application of the flex spline. The thickness of the thinner section 360a, 360b can be constant across the thinner section or could vary across the inner section.

Figures 6, 7:
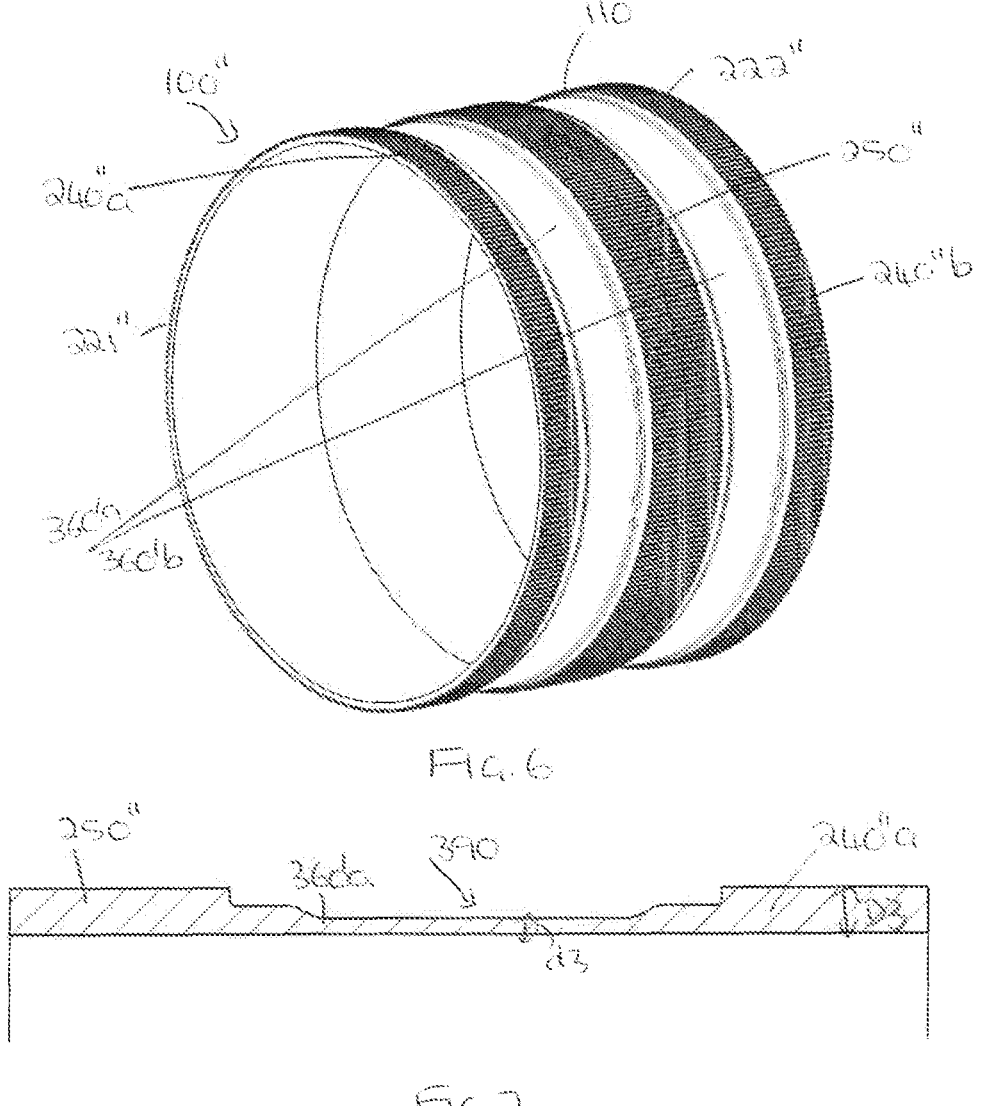
FIG. 6 shows a 3D view of another example of a straight flex spline for a strain wave drive according to this disclosure.
FIG. 7 shows in close up the geometry of an example of a flex spline as shown in FIG. 6.

FIGS. 6 and 7 (where references correspond to those of FIGS. 4 and 5 but with an additional ') show a variation of FIGS. 6 and 7 in which the thinner section is formed by an undercut 390 on the outer diameter of the flex spline body in the section(s) 160"a, 160"b to provide the reduced thickness d3 compared to the thickness D3 of the body either side of the thinner section. Again, the thickness d3 of the thinner section may be constant or varying across the thinner section.

Figures 8, 9:
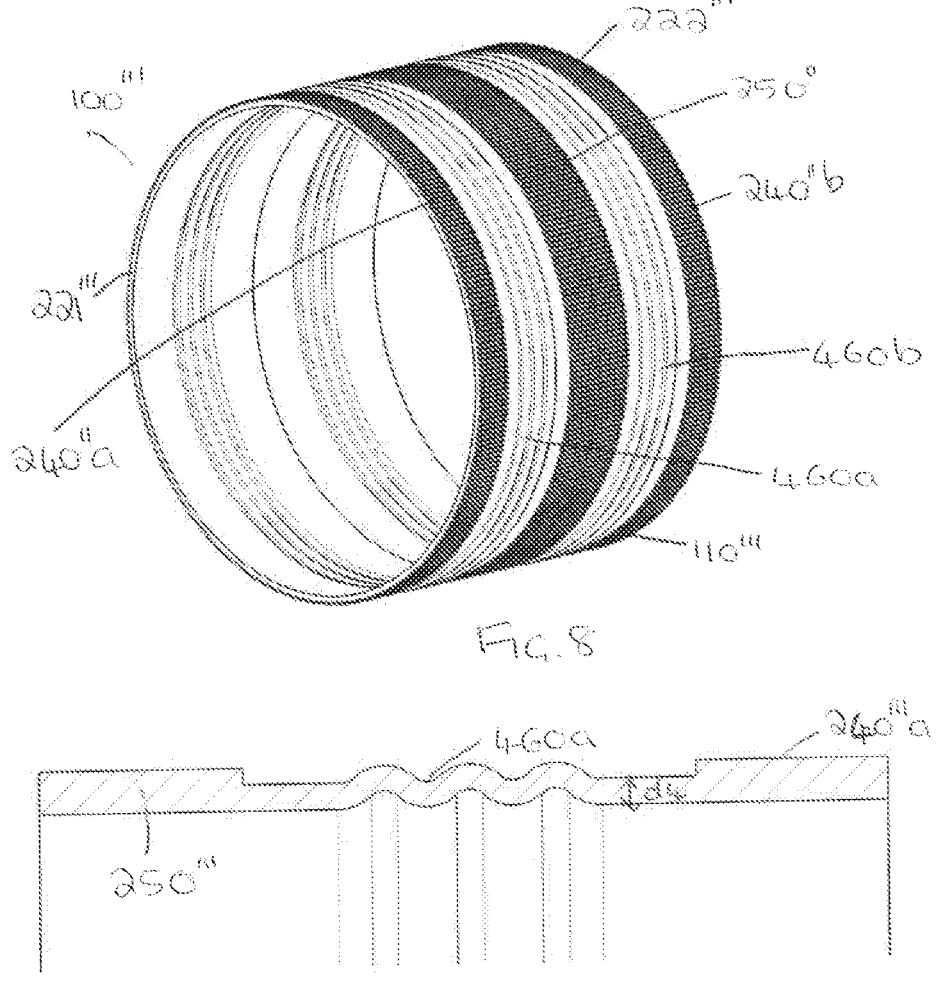
FIG. 8 shows a 3D view of another example of a straight flex spline for a strain wave drive according to this disclosure.
FIG. 9 shows in close up the geometry of an example of a flex spline as shown in FIG. 8.

In a further example, the changed geometry may be provided by a corrugated shape of the sections 460. All other parts of the flex spline in the examples of FIGS. 8 and 9 are as described for the other examples and use the same reference numerals with an additional '. The corrugated sections 460a, 460b may be formed with a plurality of peaks and valleys extending across the whole section 460 or the corrugations may only extend over part of the section and the ends of the section, for example, could just be formed as a thinner section relative to the thickness of the body either side. The thickness d4 of the material in the section 460 can be constant or vary across the section. The corrugations 460 add more effective or structural length to the flex spline without actually taking up more space in the axial direction.

These examples are just some ways of providing a section of changed geometry with increased flexibility to the tubular body of the flex spline between its open ends. Furthermore, the geometric features of the various embodiments can also be combined in the sections.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A flex spline for a strain wave drive, the flex spline comprising:
   - a flexible tubular body having a first open end and a second open end;
   - a first set of radially outwardly extending teeth around its outer periphery at the first open end;
   - a second set of radially outwardly extending teeth around its outer periphery at the second open end; and
   - a third set of teeth located axially between the first and the second sets of teeth, wherein the teeth extend outwardly;
   - wherein the flexible tubular body further comprises:
   - one or more sections of changed geometry located between the first and third sets of teeth or the second and third sets of teeth,
   - wherein the sections of changed geometry are provided with a geometric feature in the flex spline body that is not present in the remainder of the flex spline body;
   - wherein the geometric feature comprises a plurality of perforations;
   - wherein the perforations are not shaped as a circle in cross-section.

2. The flex spline of claim 1, wherein the perforations are elliptical in cross-section.

3. A strain wave drive comprising:
   a flex spline according to claim 1.

4. The strain wave drive of claim 3 for moving a flight control surface of an aircraft.

5. A flex spline for a strain wave drive, the flex spline comprising:
   - a flexible tubular body having a first open end and a second open end;
   - a first set of radially outwardly extending teeth around its outer periphery at the first open end;
   - a second set of radially outwardly extending teeth around its outer periphery at the second open end; and
   - a third set of teeth located axially between the first and the second sets of teeth, wherein the teeth extend outwardly;
   - wherein the flexible tubular body further comprises:
   - one or more sections of changed geometry located between the first and third sets of teeth or the second and third sets of teeth,
   - wherein the sections of changed geometry are provided with a geometric feature in the flex spline body that is not present in the remainder of the flex spline body;
   - wherein the geometric feature comprises a portion of reduced thickness;
   - wherein a radially inner undercut creates the portion of reduce thickness.

6. The flex spline of claim 5, wherein the portion of reduced thickness has a varying thickness across the section.

7. A strain wave drive comprising:
   a flex spline according to claim 5.

8. The strain wave drive of claim 7 for moving a flight control surface of an aircraft.

9. A flex spline for a strain wave drive, the flex spline comprising:
   - a flexible tubular body having a first open end and a second open end;
   - a first set of radially outwardly extending teeth around its outer periphery at the first open end;
   - a second set of radially outwardly extending teeth around its outer periphery at the second open end; and a third set of teeth located axially between the first and the
second sets of teeth, wherein the teeth extend out-
wardly;

wherein the flexible tubular body further comprises:

one or more sections of changed geometry located
between the first and third sets of teeth or the second
and third sets of teeth, wherein the sections of changed geometry are provided
with a geometric feature in the flex spline body that is
not present in the remainder of the flex spline body;

wherein the geometric feature comprises corrugations
formed in the body.

10. The flex spline of claim 9, wherein the section of
changed geometry includes a corrugated portion and a
portion of reduced thickness.

11. A strain wave drive comprising:

a flex spline according to claim 10.

12. The strain wave drive of claim 11 for moving a flight
control surface of an aircraft.

\* \* \* \* \*